United States Patent
Hao et al.

(10) Patent No.: US 12,267,275 B2
(45) Date of Patent: Apr. 1, 2025

(54) REFERENCE SIGNAL CONFIGURATION DETERMINING METHOD AND APPARATUS

(71) Applicant: Huawei Technologies Co., Ltd., Shenzhen (CN)

(72) Inventors: Jinping Hao, Shanghai (CN); Su Huang, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 373 days.

(21) Appl. No.: 17/709,127

(22) Filed: Mar. 30, 2022

(65) Prior Publication Data

US 2022/0224488 A1 Jul. 14, 2022

Related U.S. Application Data

(63) Continuation of application No. PCT/CN2020/119404, filed on Sep. 30, 2020.

(30) Foreign Application Priority Data

Sep. 30, 2019 (CN) .......................... 201910945921.8

(51) Int. Cl.
*H04L 5/00* (2006.01)

(52) U.S. Cl.
CPC ................................. *H04L 5/0053* (2013.01)

(58) Field of Classification Search
CPC ..... H04L 5/003; H04L 5/0053; H04L 27/261; H04L 2025/03783; H04W 56/006; H04W 24/00; H04W 24/02; H04W 24/10
See application file for complete search history.

(56) References Cited

U.S. PATENT DOCUMENTS

| 11,095,412 B2* | 8/2021 | Dou ................... H04W 72/0453 |
| 2012/0040687 A1 | 2/2012 | Siomina et al. |

(Continued)

FOREIGN PATENT DOCUMENTS

| CN | 106922018 A | 7/2017 |
| CN | 108076510 A | 5/2018 |

(Continued)

OTHER PUBLICATIONS

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 11)," 3GPP TS 36.305 V11.1.0, total 58 pages, 3rd Generation Partnership Project, Valbonne, France (Sep. 2012).

(Continued)

*Primary Examiner* — Warner Wong
(74) *Attorney, Agent, or Firm* — Leydig, Voit & Mayer, Ltd.

(57) ABSTRACT

A reference signal configuration determining method and apparatus are provided. The method includes: a network device determines a first configuration for sending an aperiodic reference signal by a to-be-positioned terminal; and the network device sends the first configuration to a location management function. The network device is a serving base station of a terminal. The serving base station of the terminal may determine an aperiodic reference signal configuration of the terminal at any time. The first configuration of the aperiodic reference signal is sent to the location management function, so that the location management function can be notified of the aperiodic reference signal configuration in time. According to the application, the location management function obtains positioning measurement information from a measurement network element based on the first configu- (Continued)

ration, thereby optimizing an uplink positioning technology and improving uplink positioning accuracy.

14 Claims, 9 Drawing Sheets

(56) References Cited

U.S. PATENT DOCUMENTS

| | | | | |
|---|---|---|---|---|
| 2012/0281604 | A1* | 11/2012 | Papasakellariou | H04L 5/0048 370/310 |
| 2013/0058306 | A1* | 3/2013 | Noh | H04L 5/0048 370/329 |
| 2013/0078913 | A1* | 3/2013 | Lee | H04W 52/54 455/39 |
| 2013/0156014 | A1* | 6/2013 | Kim | H04W 72/20 370/336 |
| 2014/0162718 | A1* | 6/2014 | Li | H04W 52/40 455/522 |
| 2015/0063095 | A1* | 3/2015 | Deng | H04W 8/005 370/221 |
| 2015/0181406 | A1* | 6/2015 | Seo | H04W 76/14 370/329 |
| 2019/0053193 | A1* | 2/2019 | Park | H04W 72/51 |
| 2021/0176096 | A1* | 6/2021 | Shimoda | H04L 5/0005 |
| 2022/0123817 | A1* | 4/2022 | Karjalainen | G01S 5/0045 |
| 2022/0131727 | A1* | 4/2022 | Khoryaev | H04L 27/261 |

FOREIGN PATENT DOCUMENTS

| | | | | |
|---|---|---|---|---|
| EP | 3544340 | A1 * | 9/2019 | G01S 5/0236 |
| WO | WO-2013169021 | A1 * | 11/2013 | H04L 1/0079 |

OTHER PUBLICATIONS

"3rd Generation Partnership Project; Technical Specification Group Radio Access Network; NG-RAN; NR Positioning Protocol A (NRPPa) (Release 15)," 3GPP TS 38.455 V15.2.1, total 60 pages, 3rd Generation Partnership Project, Valbonne, France (Jan. 2019).
"3rd Generation Partnership Project; Technical Specification Group Radio Access Network; Evolved Universal Terrestrial Radio Access (E-UTRA); LTE Positioning Protocol A (LPPa) (Release 15)," 3GPP TS 36.455 V15.0.0, total 83 pages, 3rd Generation Partnership Project, Valbonne, France (Jun. 2018).
"3rd Generation Partnership Project; Technical Specification Group Radio Access Network; NG Radio Access Network (NG-RAN); Stage 2 functional specification of User Equipment (UE) positioning in NG-RAN (Release 15)," 3GPP TS 38.305 V15.4.0, total 72 pages, 3rd Generation Partnership Project, Valbonne, France (Jun. 2019).
Alcatel-Lucent, Alcatel-Lucent Shanghai Bell, "[Draft] Reply LS on network-based positioning," 3GPP TSG RAN WG1 Meeting #68bis, Jeju, Korea, R1-121215, total 2 pages, 3rd Generation Partnership Project, Valbonne, France (Mar. 26-30, 2012).
"Considerations on UL only positioning method in NR," 3GPP TSG-RAN WG2 Meeting #106, Reno, US, R2-1907760, XP051731189, Total 5 pages, 3rd Generation Partnership Project, Valbonne, France (May 13-17, 2019).
"Discussion on UL Reference Signals for NR Positioning," 3GPP TSG RAN WG1 #98, Prague, CZ, R1-1908357, XP051764966, Total 6 pages, 3rd Generation Partnership Project, Valbonne, France (Aug. 26-30, 2019).
CATT, "UL Reference Signals for NR Positioning," 3GPP TSG RAN WG1 Meeting #98, R1-1908572, Prague, CZ, Total 7 pages (Aug. 26-30, 2019).
Qualcomm Incorporated, "DL and UL NR Positioning Procedures," 3GPP TSG-RAN WG2 Meeting #107, R2-1909416, Revision of R2-1906779, Prague, CZ, Total 10 pages, 3rd Generation Partnership Project, Valbonne, France (Aug. 26-30, 2019).

* cited by examiner

REFERENCE SIGNAL CONFIGURATION DETERMINING METHOD AND APPARATUS

CROSS-REFERENCE TO RELATED APPLICATIONS

This application is a continuation of International Application No. PCT/CN2020/119404, filed on Sep. 30, 2020, claims priority to Chinese Patent Application No. 201910945921.8, filed on Sep. 30, 2019. The disclosures of the aforementioned applications are hereby incorporated by reference in their entireties.

TECHNICAL FIELD

Embodiments of this application relate to the field of communication technologies, and in particular, to a reference signal configuration determining method and apparatus.

BACKGROUND

In a mobile communication system, positioning is one of important functions. Currently, base station based positioning technologies include an uplink positioning technology, a downlink positioning technology, and an uplink-downlink positioning technology. The uplink positioning technology is used to determine a location of a terminal based on information about an uplink reference signal from the terminal to a base station.

A network has an increasingly high requirement for accuracy of uplink positioning. How to optimize the uplink positioning technology to improve uplink positioning accuracy is an issue that needs to be resolved.

SUMMARY

Embodiments of this application provide a reference signal configuration determining method and apparatus, to optimize an uplink positioning technology and improve uplink positioning accuracy.

Specific technical solutions provided in embodiments of this application are described below:

According to a first aspect, a reference signal configuration determining method is provided. The method may be performed by a network device, and the method may be implemented by using the following steps: The network device determines a first configuration for sending an aperiodic reference signal by a to-be-positioned terminal; and the network device sends the first configuration to a location management function. The network device is a serving base station of a terminal. The serving base station of the terminal may determine an aperiodic reference signal configuration of the terminal at any time. The first configuration of the aperiodic reference signal is sent to the location management function, so that the location management function can be notified of the aperiodic reference signal configuration in time. In this way, the location management function obtains positioning measurement information from a measurement network element based on the first configuration. Because the configuration of the aperiodic reference signal may be performed by the network device at any time, the configuration can adapt to a latest terminal reporting condition. Uplink positioning based on the configuration of the aperiodic reference signal has improved accuracy.

In a possible design, the network device sends first indication information to the location management function, where the first indication information is used to indicate that the first configuration is the configuration of the aperiodic reference signal. In this way, a type or a characteristic of the first configuration sent this time can be indicated to the location management function, and may be distinguished from a configuration of a periodic reference signal.

In a possible design, the network device receives a first request message from the location management function before sending the first configuration, where the first request message is used to request a configuration for sending a reference signal by the to-be-positioned terminal.

In a possible design, the first request message includes second indication information, where the second indication information is used to indicate whether to request the configuration for sending the aperiodic reference signal by the to-be-positioned terminal.

In a possible design, the first request message includes third indication information, where the third indication information is used to indicate a type of the requested configuration, and the type of the configuration includes one, or any combination of a plurality, of the following: a configuration for sending a periodic reference signal by the to-be-positioned terminal, or a configuration for sending an aperiodic reference signal by the to-be-positioned terminal.

In a possible design, the network device configures the to-be-positioned terminal to send the aperiodic reference signal.

In a possible design, the network device sends a first response message for the first request message to the location management function, where the first response message includes a second configuration for sending the periodic reference signal by the to-be-positioned terminal.

In a possible design, that the network device sends the first configuration to a location management function may be implemented in the following manner: The network device sends a second response message for the first request message to the location management function, where the second response message includes the first configuration.

In a possible design, the network device sends the third response message for the first request message to the location management function, where the second response message includes the first configuration and the second configuration for sending the periodic reference signal by the to-be-positioned terminal.

In a possible design, that the network device sends the first configuration to a location management function may be implemented in the following manner: The network device sends a first message to the location management function, which is referred to as, for example, an uplink positioning message, where the first message includes the first configuration.

According to a second aspect, a reference signal configuration determining method is provided, where the method is applied to a network device, the network device includes a centralized unit CU and a distributed unit DU, and the method includes: The CU determines a first configuration for sending an aperiodic reference signal by a to-be-positioned terminal, or the CU receives a first configuration for sending an aperiodic reference signal by a to-be-positioned terminal from the DU; and the CU sends the first configuration to a location management function. The CU sends a configuration of the aperiodic reference signal to the location management function, so that the location management function can obtain the configuration of the aperiodic reference signal configuration, and can obtain positioning measurement information from a measurement network element based on the configuration of the aperiodic reference signal. Because the configuration of the aperiodic reference signal may be performed by the network device at any time, the configuration can adapt to a latest terminal reporting condition. Uplink positioning based on the configuration of the aperiodic reference signal has improved accuracy.

In a possible design, the CU receives first indication information from the DU, where the first indication information is used to indicate that the first configuration is the configuration of the aperiodic reference signal; and the CU sends the first indication information to the location management function. In this way, a type or a characteristic of the first configuration sent this time can be indicated to the location management function, and may be distinguished from a configuration of a periodic reference signal.

In a possible design, the CU receives a first request message from the location management function before sending the first configuration to the location management function, where the first request message is used to request a configuration for sending a reference signal by the to-be-positioned terminal.

Optionally, the CU sends a second request message to the DU based on the first request message, where the second request message is used to request the configuration for sending the reference signal by the to-be-positioned terminal. Alternatively, the CU determines the configuration for sending the reference signal by the to-be-positioned terminal.

In a possible design, the first request message includes second indication information, where the second indication information is used to indicate whether to request the configuration for sending the aperiodic reference signal by the to-be-positioned terminal.

In a possible design, the first request message includes third indication information, where the third indication information is used to indicate a type of the requested configuration, and the type of the configuration includes one, or any combination of a plurality, of the following: a configuration for sending a periodic reference signal by the to-be-positioned terminal, or a configuration for sending an aperiodic reference signal by the to-be-positioned terminal.

In a possible design, the CU receives a second response message for the second request message from the DU, where the second response message includes a second configuration for sending the periodic reference signal by the to-be-positioned terminal; and the CU sends a first response message for the first request message to the location management function based on the second response message, where the first response message includes the second configuration for sending the periodic reference signal by the to-be-positioned terminal.

In a possible design, the CU determines the second configuration for sending the periodic reference signal by the to-be-positioned terminal; and the CU sends the second configuration to the DU.

In a possible design, that the CU sends the first configuration to a location management function includes:

The CU receives a second response message for a second request message from the DU, where the second response message includes the first configuration; and the CU sends a first response message for the first request message to the location management function based on the second response message, where the first response message includes the first configuration.

In a possible design, that the CU sends the first configuration to a location management function may be implemented in the following manner: The CU receives a first message from the DU, which is referred to as, for example, an uplink positioning message, where the uplink positioning message includes the first configuration; and the CU sends the uplink positioning message to the location management function.

In a possible design, the CU sends fourth indication information to the DU, where the fourth indication information is used to indicate the DU to determine the configuration for sending the aperiodic reference signal by the to-be-positioned terminal.

In a possible design, the CU determines the configuration for sending the aperiodic reference signal by the to-be-positioned terminal; and the CU sends the configuration to the DU.

According to a third aspect, a reference signal configuration determining method is provided, where the method is applied to a network device, the network device includes a centralized unit CU and a distributed unit DU, and the method includes: The DU determines a first configuration for sending an aperiodic reference signal by a to-be-positioned terminal; and the DU sends the first configuration to the CU, or the DU sends the first configuration to a location management function through the CU. The DU sends a configuration of the aperiodic reference signal to the location management function, so that the location management function can obtain the configuration of the aperiodic reference signal, and can obtain positioning measurement information from a measurement network element based on the configuration of the aperiodic reference signal. Because the configuration of the aperiodic reference signal may be performed by the network device at any time, the configuration can adapt to a latest terminal reporting condition. Uplink positioning based on the configuration of the aperiodic reference signal has improved accuracy.

In the following descriptions, that the DU sends information or configuration to the location management function through the CU may be understood as that the DU sends the information or the configuration to the CU, and then the CU forwards the information or the configuration to the location management function.

In a possible design, the DU sends first indication information to the location management function through the CU, where the first indication information is used to indicate that the first configuration is the configuration of the aperiodic reference signal. In this way, a type or a characteristic of the first configuration sent this time can be indicated to the location management function, and may be distinguished from a configuration of a periodic reference signal.

In a possible design, the DU configures the to-be-positioned terminal to send the aperiodic reference signal.

In a possible design, the DU receives a first request message from the location management function through the CU, where the first request message is used to request a configuration for sending a reference signal by the to-be-positioned terminal. Alternatively, the DU receives a first request message from the CU, where the first request message is used to request a configuration for sending a reference signal by the to-be-positioned terminal.

In a possible design, the first request message includes second indication information, where the second indication information is used to indicate whether to request the configuration for sending the aperiodic reference signal by the to-be-positioned terminal.

In a possible design, the first request message includes third indication information, the third indication information is used to indicate a type of the requested configuration, and the type of the configuration includes one, or any combination of a plurality, of the following: a configuration for sending a periodic reference signal by the to-be-positioned terminal, or a configuration for sending an aperiodic reference signal by the to-be-positioned terminal.

In a possible design, the DU sends a first response message for the first request message to the location management function through the CU, where the first response message includes a second configuration for sending a periodic reference signal by the to-be-positioned terminal.

In a possible design, that the DU sends the first configuration to a location management function through the CU includes:

The DU sends a first response message for the first request message to the location management function through the CU, where the first response message includes the first configuration. Alternatively, the first response message includes the second configuration: or the first response message includes the first configuration and the second configuration.

In a possible design, that the DU sends the first configuration to a location management function through the CU may be implemented in the following manner: The DU sends an uplink positioning information update message to the location management function through the CU, where the uplink positioning information update message includes the first configuration.

According to a fourth aspect, a reference signal configuration determining method is provided. The method includes: A location management function receives a first configuration from a network device, where the first configuration is a configuration for sending an aperiodic reference signal by a to-be-positioned terminal. The network device sends a configuration of the aperiodic reference signal to the location management function, so that the location management function can obtain the configuration of the aperiodic reference signal, and can obtain positioning measurement information from a measurement network element based on the configuration of the aperiodic reference signal. Because the configuration of the aperiodic reference signal may be performed by the network device at any time, the configuration can adapt to a latest terminal reporting condition. Uplink positioning based on the configuration of the aperiodic reference signal has improved accuracy.

In a possible design, the location management function receives first indication information from the network device, where the first indication information is used to indicate that the first configuration is a configuration of the aperiodic reference signal.

In a possible design, the location management function sends a first request message to the network device, where the first request message is used to request a configuration for sending a reference signal by the to-be-positioned terminal.

In a possible design, the first request message includes second indication information, where the second indication information is used to indicate whether to request the configuration for sending the aperiodic reference signal by the to-be-positioned terminal.

In a possible design, the first request message includes third indication information, the third indication information is used to indicate a type of the requested configuration, and the type of the configuration includes one, or any combination of a plurality, of the following: a configuration for sending a periodic reference signal by the to-be-positioned terminal, or a configuration for sending an aperiodic reference signal by the to-be-positioned terminal.

In a possible design, the location management function receives a first response message for the first request message from the network device, where the first response message includes a second configuration for sending a periodic reference signal by the to-be-positioned terminal.

In a possible design, that a location management function receives a first configuration from a network device includes:

The location management function receives a second response message for the first request message from the network device, where the second response message includes the first configuration. Alternatively, the second response message includes the second configuration: or the second response message includes the first configuration and the second configuration.

In a possible design, that a location management function receives a first configuration from a network device includes:

The location management function receives a first message from the network device, which is referred to as, for example, an uplink positioning message, where the first message includes the first configuration.

In a possible design, the location management function sends a measurement request to the measurement network element, where the measurement request is used to request positioning measurement information of the to-be-positioned terminal, and the measurement request includes the first configuration.

In a possible design, the location management function receives a measurement response from the measurement network element, where the measurement response is used to respond to a measurement request, and the measurement response includes positioning measurement information of the to-be-positioned terminal.

In a possible design, the network device determines whether to configure sending of the aperiodic reference signal for the to-be-positioned terminal; and the network device determines to configure the sending of the aperiodic reference signal for the to-be-positioned terminal.

According to a fifth aspect, an apparatus is provided, where the apparatus may be a network device, an apparatus (for example, a chip, a chip system, or a circuit) in the network device, or an apparatus that can be used in cooperation with the network device. In a design, the apparatus may include modules that are in a one-to-one correspondence with the methods/operations/steps/actions described in the first aspect. The modules may be implemented by a hardware circuit, software, or a combination of a hardware circuit and software. In a design, the apparatus may include a processing module and a communication module. The processing module is configured to invoke the communication module to perform a receiving function and/or a sending function. For example, the processing module is configured to determine a first configuration for sending an aperiodic reference signal by a to-be-positioned terminal; and the communication module is configured to send the first configuration to a location management function.

According to a sixth aspect, an apparatus is provided, where the apparatus is applied to a network device, the network device includes a centralized unit CU and a distributed unit DU, and the apparatus may be the CU, an apparatus (for example, a chip, a chip system, or a circuit) in the CU, or an apparatus that can be used in cooperation with the CU. In a design, the apparatus may include modules that are in a one-to-one correspondence with the methods/operations/steps/actions described in the second aspect. The modules may be implemented by a hardware circuit, software, or a combination of a hardware circuit and software. In a design, the apparatus may include a processing module and a communication module. The processing module is configured to invoke the communication module to perform a receiving function and/or a sending function. For example, the processing module is configured to determine a first configuration for sending an aperiodic reference signal by a to-be-positioned terminal; and the communication module is configured to send the first configuration to a location management function. Alternatively, the communication module is configured to: receive, from the DU, a first configuration for sending an aperiodic reference signal by a to-be-positioned terminal; and send the first configuration to a location management function.

According to a seventh aspect, an apparatus is provided, where the apparatus is applied to a network device, the network device includes a centralized unit CU and a distributed unit DU, and the apparatus may be the DU, an apparatus (for example, a chip, a chip system, or a circuit) in the DU, or an apparatus that can be used in cooperation with the DU. In a design, the apparatus may include modules that are in a one-to-one correspondence with the methods/operations/steps/actions described in the third aspect. The modules may be implemented by a hardware circuit, software, or a combination of a hardware circuit and software. In a design, the apparatus may include a processing module and a communication module. The processing module is configured to invoke the communication module to perform a receiving function and/or a sending function. For example, the processing module is configured to determine a first configuration for sending an aperiodic reference signal by a to-be-positioned terminal; and the communication module is configured to send the first configuration to the CU, or is configured to send the first configuration to a location management function through the CU.

According to an eighth aspect, an apparatus is provided, where the apparatus is applied to a location management function, and the apparatus may be the location management function, an apparatus (for example, a chip, a chip system, or a circuit) in the location management function, or an apparatus that can be used in cooperation with the location management function. In a design, the apparatus may include modules that are in a one-to-one correspondence with the methods/operations/steps/actions described in the fourth aspect. The modules may be implemented by a hardware circuit, software, or a combination of a hardware circuit and software. In a design, the apparatus may include a processing module and a communication module. The processing module is configured to invoke the communication module to perform a receiving function and/or a sending function. For example, the communication module is configured to receive a first configuration from a network device, where the first configuration is a configuration for sending an aperiodic reference signal by a to-be-positioned terminal.

According to a ninth aspect, an embodiment of this application provides an apparatus, for example, the apparatus is a network device. The apparatus includes a communication interface and a processor, where the communication interface is used by the apparatus to communicate with another device, for example, to receive and send data or a signal. For example, the communication interface may be a transceiver, a circuit, a bus, a module, or a communication interface of another type, and the another device may be a location management function. The processor is configured to invoke a group of programs, instructions, or data, to perform the method described in the first aspect. The apparatus may further include a memory, configured to store the programs, the instructions, or the data invoked by the processor. The memory is coupled to the processor, and when executing the instructions or the data stored in the memory, the processor can implement the method described in the first aspect.

According to a tenth aspect, an embodiment of this application provides an apparatus, for example, the apparatus is a CU in a network device. The apparatus includes a communication interface and a processor, where the communication interface is used by the apparatus to communicate with another device, for example, to receive and send data or a signal. For example, the communication interface may be a transceiver, a circuit, a bus, a module, or a communication interface of another type, and the another device may be a DU in the network device or a location management function. The processor is configured to invoke a group of programs, instructions, or data, to perform the method described in the second aspect. The apparatus may further include a memory, configured to store the programs, the instructions, or the data invoked by the processor. The memory is coupled to the processor, and when executing the instructions or the data stored in the memory, the processor can implement the method described in the second aspect.

According to an eleventh aspect, an embodiment of this application provides an apparatus, for example, the apparatus is a DU in a network device. The apparatus includes a communication interface and a processor, where the communication interface is used by the apparatus to communicate with another device, for example, to receive and send data or a signal. For example, the communication interface may be a transceiver, a circuit, a bus, a module, or a communication interface of another type, and the another device may be a location management function or a CU. The processor is configured to invoke a group of programs, instructions, or data, to perform the method described in the third aspect. The apparatus may further include a memory, configured to store the programs, the instructions, or the data invoked by the processor. The memory is coupled to the processor, and when executing the instructions or the data stored in the memory, the processor can implement the method described in the third aspect.

According to a twelfth aspect, an embodiment of this application provides an apparatus. The apparatus includes a communication interface and a processor, where the communication interface is used by the apparatus to communicate with another device, for example, to receive and send data or a signal. For example, the communication interface may be a transceiver, a circuit, a bus, a module, or a communication interface of another type, and the another device may be a network device. The processor is configured to invoke a group of programs, instructions, or data, to perform the method described in the fourth aspect. The apparatus may further include a memory, configured to store the programs, the instructions, or the data invoked by the processor. The memory is coupled to the processor, and when executing the instructions or the data stored in the memory, the processor can implement the method described in the fourth aspect.

According to a thirteenth aspect, an embodiment of this application further provides a computer-readable storage medium, where the computer storage medium stores computer-readable instructions, and when the computer-readable instructions are run on a computer, the computer is enabled to perform the method according to any one of the aspects or the possible designs of the aspects.

According to a fourteenth aspect, an embodiment of this application provides a chip system. The chip system includes a processor, and may further include a memory, to implement the method according to any one of the first aspect or the possible designs of the first aspect. The chip system may include a chip, or may include a chip and another discrete component.

According to a fifteenth aspect, an embodiment of this application provides a chip system. The chip system includes a processor, and may further include a memory, to implement the method according to any one of the second aspect or the possible designs of the second aspect. The chip system may include a chip, or may include a chip and another discrete component.

According to a sixteenth aspect, an embodiment of this application provides a chip system. The chip system includes a processor, and may further include a memory, to implement the method according to any one of the third aspect or the possible designs of the third aspect. The chip system may include a chip, or may include a chip and another discrete component.

According to a seventeenth aspect, an embodiment of this application provides a chip system. The chip system includes a processor, and may further include a memory, to implement the method according to any one of the fourth aspect or the possible designs of the fourth aspect. The chip system may include a chip, or may include a chip and another discrete component.

According to an eighteenth aspect, an embodiment of this application provides a system, where the system includes a network device and a location management function, the network device is configured to perform the method in any one of the first aspect or the possible designs, and the location management function is configured to perform the method in any one of the fourth aspect or the possible designs.

According to an eighteenth aspect, an embodiment of this application provides a network device, where the network device includes a CU, a DU, and a location management function. The CU is configured to perform the method in any one of the first aspect or the possible designs: the DU is configured to perform the method in any one of the second aspect or the possible designs; and the location management function is configured to perform the method in any one of the fourth aspect or possible designs.

According to a nineteenth aspect, an embodiment of this application further provides a computer program product, including instructions. When the instructions are run on a computer, the computer is enabled to perform the method according to any one of the aspects or the possible designs of the aspects.

DESCRIPTION OF EMBODIMENTS

Embodiments of this application provide a reference signal configuration determining method and apparatus, to optimize an uplink positioning technology and improve uplink positioning accuracy. The method and the apparatus are based on a same concept. Because a problem-resolving principle of the method is similar to that of the apparatus, mutual reference may be made to implementations of the apparatus and the method. Repeated parts are not described in detail. In descriptions of embodiments of this application, the term "and/or" describes an association relationship between associated objects and represents that three relationships may exist. For example, A and/or B may represent the following three cases: Only A exists, both A and B exist, and only B exists. The character "/" between characters generally represents an "or" relationship between associated objects. In embodiments of this application, "at least one" means one or more, and "a plurality of" means two or more. In addition, it should be understood that in descriptions of this application, terms such as "first" and "second" are merely intended for distinction and description, and shall not be understood as an indication or implication of relative importance or an indication or implication of an order.

A reference signal configuration determining method provided in embodiments of this application may be applied to a long term evolution (LTE) system, a 5th generation (5G) communication system, or various future communication systems, for example, a 6th generation (6G) communication system. 5G may also be referred to as new radio (NR).

The following describes in detail embodiments of this application with reference to the accompanying drawings.

Figure 1:
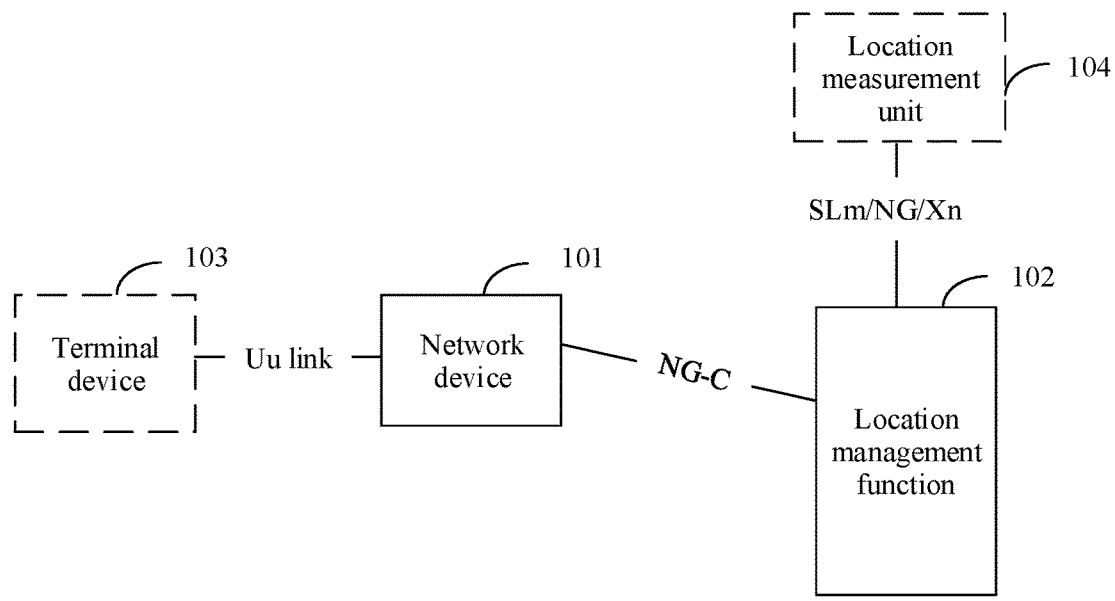
FIG. 1 is a first schematic diagram of an architecture of a communication system according to an embodiment of this application.

FIG. 1 shows a possible architecture of a communication system to which a reference signal configuration determining method is applicable according to an embodiment of this application. The communication system may include a network device 101 and a location management function 102. The location management function 102 is configured to perform location calculation on a terminal device 103 based on a measurement result of another network element (for example, a base station). The location management function 102 may be a location management function (LMF) network element. The communication system may further include a terminal 103 and a measurement network element 104 (or a location measurement network element). The measurement network element may also be referred to as a measurement node. The location management function 102 is connected to the measurement network element 104 through an SLm interface or an NG interface. When the measurement network element is a base station, the location management function 102 is connected to the measurement network element 104 through the NG interface. An interface between the location management function 102 and the measurement network element 104 may alternatively be an Xn interface. The network device 101 may be a serving base station of the terminal device 103. The network device 101 provides an access service for the terminal device 103. After accessing the network device 101, the terminal device 103 may communicate with a network side through the network device 101. The measurement network element 104 may be a device configured to measure positioning information, such as a base station or a location measurement unit (LMU). The positioning information measured by the measurement network element is referred to as positioning measurement information below: The positioning measurement information may be obtained by measuring a reference signal of a terminal. The base station or the LMU may measure a reference signal sent by the terminal device 103, to obtain a measurement result for locating the terminal device. The following uses an example in which the measurement network element 104 is the LMU, and the location management function 102 is connected to the measurement network element 104 through the SLm interface.

The terminal device 103 communicates with the network device 101 through a cellular link (a Uu link), the network device 101 communicates with the location management function 102 through an NG-C interface, and the location management function 102 communicates with the measurement network element 104 through the SLm interface.

Figure 2:
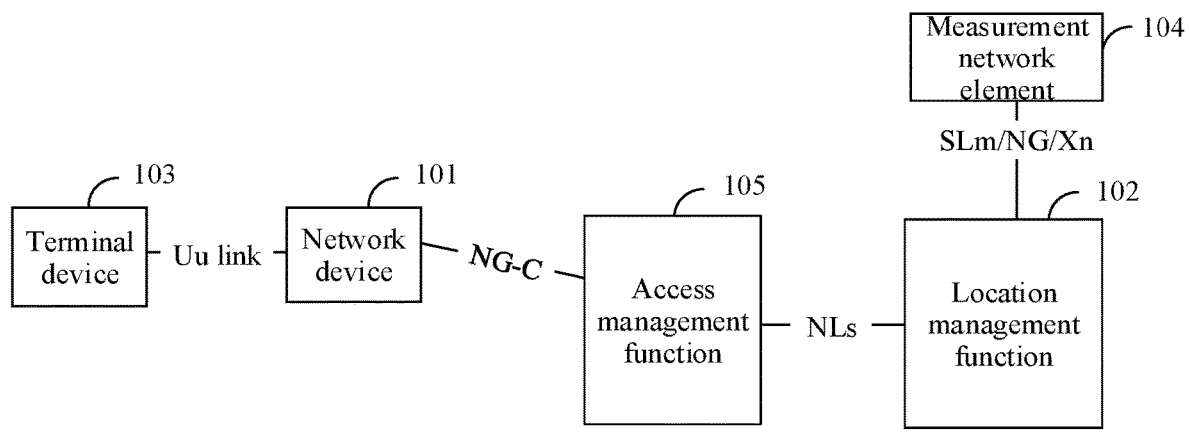
FIG. 2 is a second schematic diagram of an architecture of a communication system according to an embodiment of this application.

Optionally, based on the system architecture shown in FIG. 1, as shown in FIG. 2, the communication system may further include an access management function (AMF) 105. The AMF 105 is a control plane network element provided by an operator, and is responsible for access control and mobility management when the terminal device 103 accesses an operator network. The network device 101 communicates with the AMF 105 through the NG-C interface, and the AMF 105 communicates with the location management function 102 through an NLs interface. The location management function 102 may interact with the network device 101 by using the AMF 105.

The terminal device 103 may also be referred to as a terminal. The terminal is also referred to as user equipment (UE), a mobile station (MS), a mobile terminal (MT), or the like, and is a device that provides voice or data connectivity for a user, or may be an internet of things device. For example, the terminal device 103 includes a handheld device or a vehicle-mounted device, or the like that has a wireless connection function. The terminal device 103 is a device that has a wireless transceiver function, and the terminal device 103 may be deployed on land, including indoor or outdoor and hand-held or vehicle-mounted devices, may be deployed on a water surface (for example, on a ship), or may be deployed in the air (for example, on a plane, a balloon, and a satellite). The terminal device may be UE, and the UE may be a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. An example in which an apparatus configured to implement a function of a terminal is a terminal or UE is used to describe the technical solutions provided in embodiments of this application.

Figure 3:
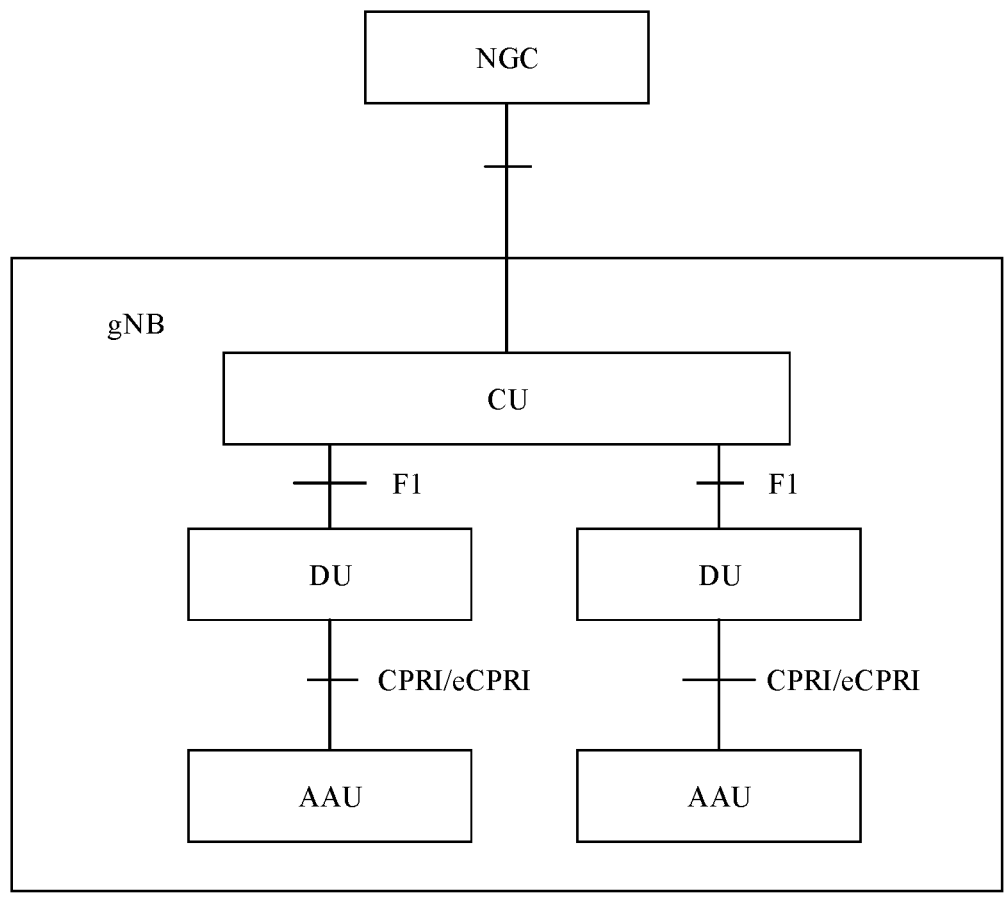
FIG. 3 is a schematic diagram of a possible form of a network device according to an embodiment of this application.

Based on the foregoing description, the following describes possible forms of the network device 101 shown in FIG. 3. The network device is a node in a radio access network (RAN), and may also be referred to as a base station or a RAN node (or device). The network device may also be referred to as a network side device. Currently, for example, some examples of the network device 101 are: a gNB/NG-NB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless fidelity (Wi-Fi) access point (AP), or a network side device in a 5G communication system or a possible future communication system. The gNB/NG-NB is a network device in a 5G or an NR system, and the eNB is a network device in LTE. In embodiments of this application, an apparatus configured to implement a function of the network device may be a network device, or may be an apparatus, for example, a chip system, that can support the network device in implementing the function. The apparatus configured to implement the function of the network device may also be installed in the network device. An example in which the apparatus configured to implement the function of the network device is a network device or a base station is used to describe the technical solutions provided in embodiments of this application.

In some deployments, the network device (for example, the gNB) in the 5G or the NR system may include a centralized unit (CU) and a distributed unit (DU). The gNB may further include an active antenna unit (AAU). The CU is a centralized node, is connected to a core network (next generation core, NGC) through an NG interface, and can control and coordinate a plurality of cells inside an access network. The CU implements some functions of the gNB, and the DU implements some functions of the gNB. For example, the CU includes protocol stack higher layer control and data functions. Main protocol layers involved include a radio resource control (RRC) function on a control plane and an IP function, a service data adaptation protocol (SDAP) function, and a packet data convergence protocol (PDCP) sublayer function on a user plane. The DU is the distributed unit. In a broad sense, the DU implements a radio frequency processing function and baseband processing functions such as radio link control (RLC), media access control (MAC), and physical layer (PHY). In a narrow sense, based on an implementation of an actual device, the DU is only responsible for a baseband processing function, and the AAU implements some processing functions of the physical layer, radio frequency processing, and a function related to an active antenna. The DU and the AAU are connected through a common public radio interface (CPRI) or an eCPRI interface. The CU and the DU are connected through an F1 interface. An interface between a CU-CP and the DU may be referred to as F1-C, and an interface between a CU-UP and the DU may be referred to as F1-U. Information at the RRC layer is eventually converted into information at the PHY layer, or is converted from information at the PHY layer. Therefore, in this architecture, higher layer signaling such as RRC layer signaling may also be considered as being sent by the DU, or being sent by the DU and the AAU. It may be understood that the network device may be a device including one or more of a CU node, a DU node, and an AAU node. In addition, the CU may serve as a network device in an access network (RAN), or the CU may serve as a network device in a core network (CN). There are a plurality of CU/DU splitting solutions. Application scenarios and performance gains of different splitting solutions are different. This is not limited in this application.

Representation forms of the system architecture and the network device provided above are possible scenarios to which embodiments of this application are applicable. With evolution and change of a network scenario, embodiments of this application may be further applied to another possible network scenario. The solutions provided in embodiments of this application are described in detail by using the foregoing system architecture and representation forms of the network device as an example.

Based on the foregoing descriptions, embodiments of this application provide a reference signal configuration determining method and apparatus, to optimize an uplink positioning technology and improve uplink positioning accuracy. Generally, the uplink positioning technology is implemented based on a reference signal. The method provided in embodiments of this application may be applied to any uplink positioning technology based on a reference signal of a terminal. In a possible implementation, uplink positioning is performed by using an uplink time difference of arrival (UTDOA) technology. The UTDOA technology uses the reference signal of the terminal to perform the uplink positioning. The UTDOA technology is used for uplink positioning in LTE. An LTE location center may be an enhanced serving mobile location center (E-SMLC). After determining a positioning method, the E-SMLC sends request information to a serving base station of UE, and indicates the serving base station of the UE to configure a sounding reference signal (SRS) resource of the UE. After receiving the request, the serving base station of the UE configures the SRS of the UE, and sends uplink SRS configuration information of the UE to the E-SMLC. The E-SMLC sends the uplink SRS configuration information of the UE to one or more LMUs to request measurement information. Each LMU performs measurement based on the uplink SRS configuration information of the UE, to obtain the measurement information for positioning. The LMU sends the measurement information to the location center. The location center calculates a location of the UE based on the measurement information reported by the plurality of LMUs.

Figure 4:
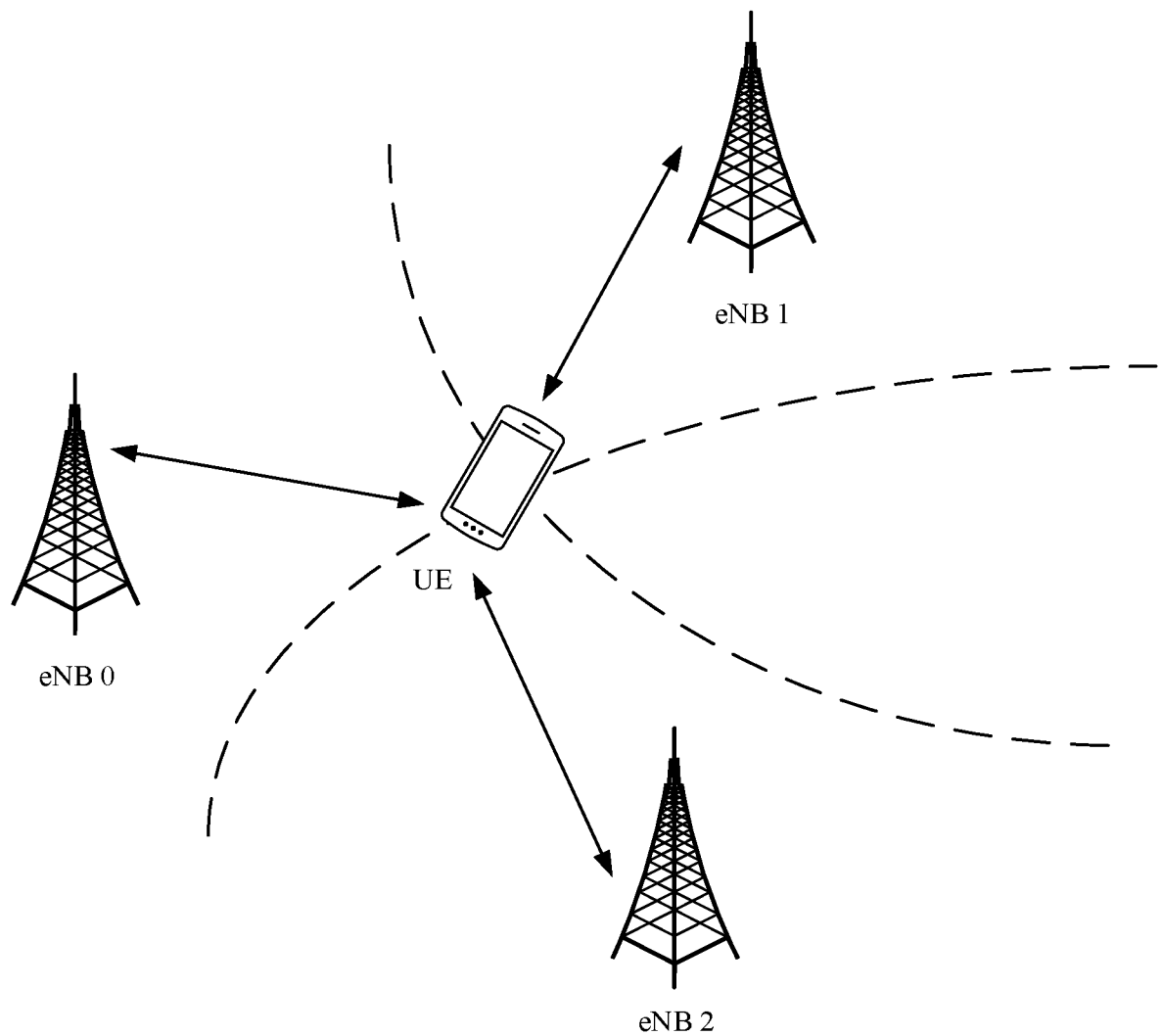
FIG. 4 is a schematic diagram of an uplink positioning method based on an uplink angle of arrival according to an embodiment of this application.

As shown in FIG. 4, in another possible implementation, uplink positioning may alternatively determine a location of UE based on an uplink angle of arrival (AOA). For example, FIG. 4 shows three base stations: an eNB 1, an eNB 2, and an eNB 3. The base station is a measurement network element. Each base station measures an uplink SRS of the UE to obtain an AOA at the base station from the UE. Each base station sends, to the location center, the measured AOA at the base station from the UE, and the location center may calculate the location of the UE based on AOAs at a plurality of base stations from the UE.

Based on the foregoing example of the UTDOA technology and the uplink AOA based uplink positioning solution, the uplink positioning requires the location center to obtain configuration information of the reference signal, and sends the configuration information of the reference signal to the measurement network element. The measurement network element measures the reference signal of the terminal based on the configuration information of the reference signal, and determines positioning-related measurement information based on the measured reference signal. The measurement network element sends the positioning-related measurement information to the location center. The location center determines the location of the terminal based on the positioning-related measurement information.

As described in the foregoing description of the system architecture, in this embodiment of this application, the location center may be a location management function 102. The location management function 102 is configured to: request a reference signal configuration of a terminal 103 from a network device 101; send the obtained reference signal configuration to each measurement network element 104; and request each measurement network element 104 to measure uplink positioning measurement information. The measurement network element 104 is configured to measure the uplink positioning measurement information. The uplink positioning measurement information may be briefly referred to as positioning measurement information, and the uplink positioning measurement information may be determined by measuring the reference signal of the terminal. The measurement network element 104 may be a base station or a location measurement unit LMU. The network device 101 is configured to send the reference signal configuration of the terminal 103 to the location management function 102.

The reference signal configuration is used to configure sending of the uplink reference signal of the terminal, for example, including an uplink reference signal resource and a sending position of the uplink reference signal. The uplink reference signal may be an SRS. The reference signal configuration may be periodic or aperiodic.

Figure 5:
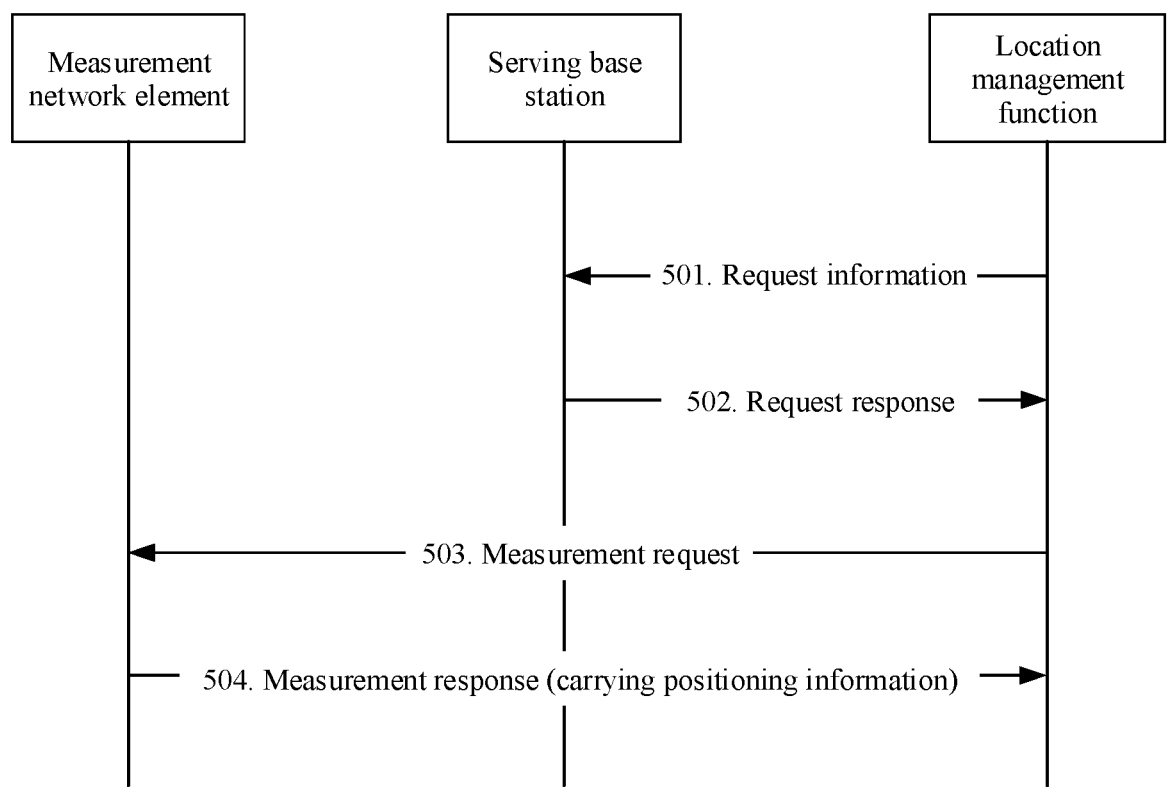
FIG. 5 is a schematic diagram of a periodic reference signal configuration determining method according to an embodiment of this application.

As shown in FIG. 5, if the reference signal configuration is periodic, a process of a reference signal configuration determining method is described below:

S501. A location management function sends request information to a serving base station of a terminal, and the serving base station of the terminal receives the request information from the location management function.

The request information is used to request a reference signal configuration of the terminal.

S502. The serving base station of the terminal sends a request response to the location management function, and the location management function receives the request response from the serving base station.

The request response includes the reference signal configuration of the terminal.

S503. The location management function sends a measurement request to one or more measurement network elements, and the measurement network element receives the measurement request from the location management function.

The measurement request is used to request positioning measurement information. The positioning measurement information includes the reference signal configuration of the terminal. The measurement network element obtains a reference signal of the terminal based on the reference signal configuration of the terminal, and determines the positioning measurement information of the terminal based on the reference signal of the terminal.

S504. The measurement network element returns a measurement response to the location management function, where the measurement response includes the positioning measurement information; and the location management function receives the measurement response from the measurement network element, and obtains the positioning measurement information from the measurement response.

In FIG. 5, one measurement network element is used as an example. It may be understood that, in an actual application, there may be a plurality of measurement network elements, and operations performed by the plurality of measurement network elements are the same as operations performed by the one measurement network element.

Because the reference signal configuration is periodic, the location management function may determine the reference signal configuration at a time by performing two steps S501 and S502.

Figure 6:
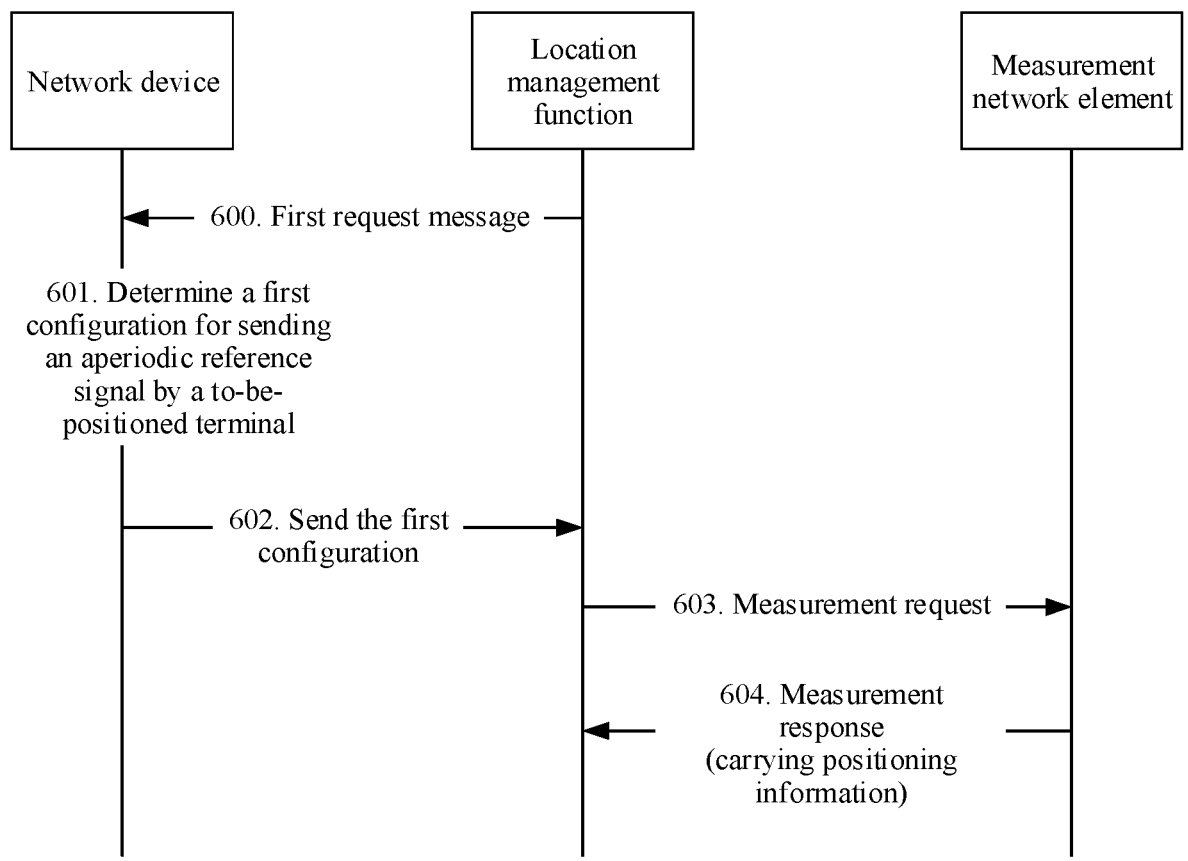
FIG. 6 is a schematic flowchart of a reference signal configuration determining method according to an embodiment of this application.

Alternatively, the reference signal configuration may be aperiodic, and the serving base station of the terminal may determine an aperiodic reference signal configuration of the terminal at any moment. As shown in FIG. 6, a reference signal configuration determining method provided in this embodiment of this application can determine the aperiodic reference signal configuration. A specific process is described below.

S601. A network device determines a first configuration for sending an aperiodic reference signal by a to-be-positioned terminal.

The network device may be a serving base station of the to-be-positioned terminal.

The first configuration is used to configure the terminal to send the aperiodic reference signal. For example, the first configuration may include one or more of the following: a slot for sending the reference signal, a slot format configuration for sending the reference signal, a symbol location for sending the reference signal, and a quantity of consecutive symbols for sending the reference signal.

For example, the reference signal is an SRS, and the aperiodic reference signal is an aperiodic sounding reference signal (AP-SRS). The first configuration of the aperiodic reference signal is used to configure the terminal to send the SRS. For example, the first configuration includes one or more of the following: a slot for sending the AP-SRS, a slot format configuration, a symbol location for sending the AP-SRS, and a quantity of consecutive symbols of the AP-SRS.

S602. The network device sends the first configuration to a location management function, and the location management function receives the first configuration from the network device.

The location management function requests positioning measurement information from a measurement network element based on the first configuration. After determining the first configuration for sending the aperiodic reference signal by the to-be-positioned terminal, the network device sends the first configuration of the aperiodic reference signal to the to-be-positioned terminal. The to-be-positioned terminal receives the first configuration, and sends the aperiodic reference signal based on the first configuration.

Optionally, the first configuration may be included in a message, for example, an uplink positioning message. The uplink positioning message may be a newly-defined new radio positioning protocol A (NRPPa) message. For example, a name of the newly-defined NRPPa message may be an uplink positioning information indication (UL positioning information indication). Certainly, the name of the newly-defined NRPPa message may have another name.

The uplink positioning message may alternatively be an existing NRPPa message. For example, the existing NRPPa message may be an uplink positioning information update (UL positioning information update) message.

The network device may further send first indication information to the location management function, where the first indication information is used to indicate that the first configuration is a configuration of the aperiodic reference signal. In this way, a type or a characteristic of the first configuration sent this time can be indicated to the location management function, and may be distinguished from a configuration of a periodic reference signal. Alternatively, the location management function may receive the first indication information from the network device, and determine that the first configuration is the configuration of the aperiodic reference signal based on the first indication information.

Certainly, if the network device does not send the first indication information to the location management function, the network device may determine, based on content of the first configuration, that the first configuration is aperiodic. For example, if the first configuration does not include a periodicity for sending the reference signal, the location management function may consider that the first configuration is aperiodic.

The first indication information and the first configuration may be included in a same message and sent at the same time. For example, the first indication information may also be included in the uplink positioning message.

The network device sends the configuration of the aperiodic reference signal to the location management function, so that the location management function can obtain the configuration of the aperiodic reference signal, and can obtain the positioning measurement information from the measurement network element based on the configuration of the aperiodic reference signal. Because the configuration of the aperiodic reference signal may be performed by the network device at any time, the configuration can adapt to a latest terminal reporting condition. Uplink positioning based on the configuration of the aperiodic reference signal has improved accuracy.

Optionally, before S601, S600 may be further included, as described below.

S600. The location management function sends a first request message to the network device, and the network device receives the first request message from the location management function.

The first request message is used to request a configuration for sending the reference signal by the to-be-positioned terminal.

There are several different implementation scenarios based on different content included in the first request message or different content indicated by the first request message.

(1) Generally, the first request message is similar to the request message sent by the location management function to the network device in S501, and is used to request the configuration of the reference signal. The configuration is usually a periodic configuration. In this case, after receiving the first request message, the network device returns a first response message to the location management function. The first response message is used to respond to the first request message. In addition, the first response message includes a configuration for sending the periodic reference signal by the to-be-positioned terminal, which is denoted as a second configuration. After returning the first response message to the location management function, the network device performs S601 and S602, to implement the first configuration of the aperiodic reference signal.

(2) The first request message may include one piece of indication information, which is denoted as second indication information. The second indication information is used to indicate whether to request to obtain the configuration for sending the aperiodic reference signal by the to-be-positioned terminal. For example, the second indication information is 1 bit, 1 is used to indicate to request the configuration for sending the aperiodic reference signal by the to-be-positioned terminal, and 0 is used to indicate not to request the configuration for sending the aperiodic reference signal by the to-be-positioned terminal.

If the second indication information indicates not to request the configuration for sending the aperiodic reference signal by the to-be-positioned terminal, refer to case (1) for subsequent operations.

If the second indication information indicates to request the configuration for sending the aperiodic reference signal by the to-be-positioned terminal, the network device may send response information to the location management function based on the second indication information, which is denoted as a second response message. The second response message is used to respond to the first request message, and the second response information includes the first configuration. In S602, that the network device sends the first configuration to a location management function, and the location management function receives the first configuration from the network device may be implemented in the following manner: The network device sends the second response message to the location management function, where the second response message includes the first configuration; and the location management function receives the second response message from the network device, and obtains the first configuration from the second response message. In addition, after receiving the second indication information, the network device may determine whether to configure sending of the aperiodic reference signal of the terminal. If the sending of the aperiodic reference signal of the terminal needs to be configured, the network device sends the second response message including the first configuration to the location management function.

(3) The first request message may include one piece of indication information, which is denoted as third indication information. The third indication information is used to indicate a type of the requested reference signal configuration. For example, the type of the reference signal configuration includes one, or any combination of a plurality, of the following: a configuration for sending a periodic reference signal by the to-be-positioned terminal, or a configuration for sending an aperiodic reference signal by the to-be-positioned terminal. That is, there may be three cases: The third indication information indicates to request the first configuration of the aperiodic reference signal: the third indication information may indicate to request the second configuration of the periodic reference signal; and the third indication information is used to indicate to request the first configuration of the aperiodic reference signal and obtain the second configuration of the periodic reference signal.

For example, a size of the third indication information may be 2 bits. The 2 bits may be used to indicate three types of the reference signal configuration.

If the third indication information is used to request the second configuration of the periodic reference signal, refer to case (1) for subsequent operations.

If the third indication information indicates to request the first configuration of the aperiodic reference signal, the network device may send the response information to the location management function based on the third indication information, which is denoted as a second response message. The second response message is used to respond to the first request message, and the second response information includes the first configuration. In S602, that the network device sends the first configuration to a location management function, and the location management function receives the first configuration from the network device may be implemented in the following manner: The network device sends the second response message to the location management function, where the second response message includes the first configuration; and the location management function receives the second response message from the network device, and obtains the first configuration from the second response message. In addition, after receiving the third indication information, the network device may determine whether to configure sending of the aperiodic reference signal of the terminal. If the sending of the aperiodic reference signal of the terminal needs to be configured, the network device sends the second response message including the first configuration to the location management function.

If the third indication information is used to indicate to request the first configuration of the aperiodic reference signal and obtain the second configuration of the periodic reference signal, the network device may send the response information including the first configuration and the second configuration to the location management function. Alternatively, the network device may send the response information including the second configuration to the location management function, and send the first configuration to the location management function in subsequent S602. In addition, after receiving the third indication information, the network device may determine whether to configure sending of the aperiodic reference signal of the terminal. If the sending of the aperiodic reference signal of the terminal needs to be configured, the network device sends the first configuration to the location management function.

In the foregoing cases (1) to (3), that the indication information indicates to request the configuration of the aperiodic reference signal may be implemented after the network device configures the periodic reference signal. For example, when the indication information indicates to request the configuration of the aperiodic reference signal, the network device may send the configuration of the periodic reference signal and the configuration of the aperiodic reference signal to the location management function. Alternatively, in the foregoing cases (1) to (3), if the indication information indicates to request the configuration of the aperiodic reference signal, the network device may also be indicated to request only the configuration of the aperiodic reference signal but not request the configuration of the periodic reference signal. In this case, the network device only needs to send the configuration of the aperiodic reference signal to the location management function, and does not need to send the configuration of the periodic reference signal to the location management function.

After S602, the following steps may be further included.

S603. The location management function sends a measurement request to the measurement network element, and the measurement network element receives the measurement request from the location management function.

The measurement request is used to request the positioning measurement information. The measurement request includes the first configuration for sending the aperiodic reference signal by the to-be-positioned terminal. The measurement network element receives, based on the first configuration, the aperiodic reference signal sent by the terminal. The measurement network element determines the positioning measurement information of the terminal based on the aperiodic reference signal. For example, the positioning measurement information of the terminal includes a location of the terminal. A possible example of the positioning measurement information is reference signal received power (RSRP) of the reference signal. After a base station configures UE to send the SRS, the measurement network element measures the RSRP of the reference signal, and the measurement network element reports the measured RSRP to the location management function. The measurement request may be a measurement update message. The measurement update message includes the first configuration.

S604. The measurement network element sends a measurement response to the location management function, and the location management function receives the measurement response from the measurement network element.

The measurement response includes the positioning measurement information of the terminal.

In FIG. 6, one measurement network element is used as an example. It may be understood that, in an actual application, there may be a plurality of measurement network elements, and operations of the plurality of measurement network elements are the same as operations of the one measurement network element.

The following describes the reference signal configuration determining method provided in embodiments of this application with reference to several specific application scenarios.

Figure 7:
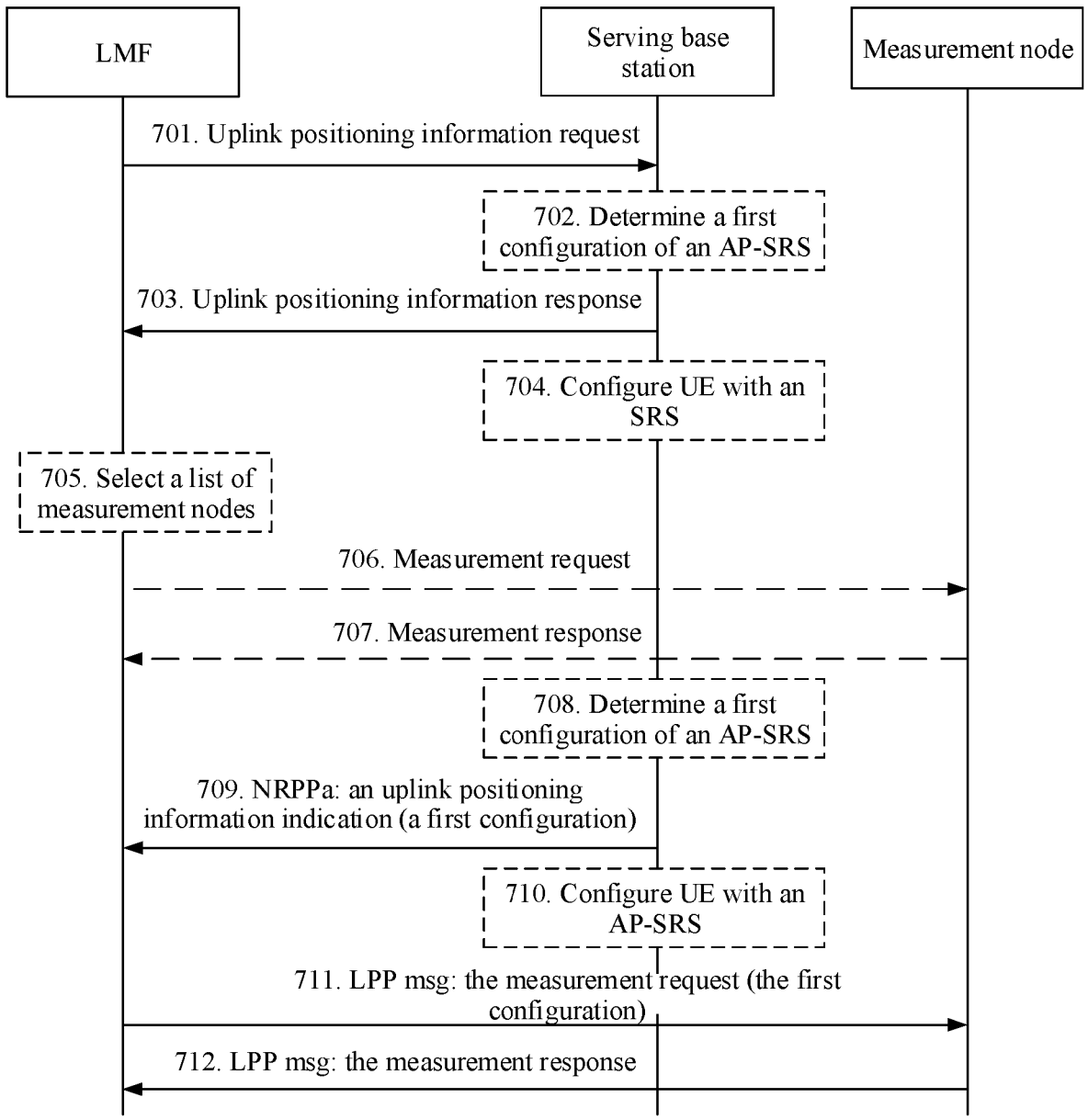
FIG. 7 is a schematic flowchart of a reference signal configuration determining method in an application scenario according to an embodiment of this application.

As shown in FIG. 7, in an application scenario, a reference signal configuration determining method is described below. For example, a network device is a serving base station of a terminal, a location management function is an LMF, and a measurement network element may also be a measurement node (measuring nodes).

S701. The LMF sends an uplink positioning information request to the serving base station, and the serving base station receives the uplink positioning information request from the LMF.

The uplink positioning information request may be an NRPPa message. The information request is used to request an uplink reference signal configuration of the terminal. The information request may include an indication. For the included indication and a function of the indication, refer to the descriptions of (2) and (3) in S600. If the indication is not included, refer to the description of (1) in S600.

S702. The serving base station determines a first configuration for sending an aperiodic reference signal by a to-be-positioned terminal.

This step is optional.

S703. The serving base station sends an uplink positioning information response to the LMF, and the LMF receives the uplink positioning information response from the serving base station.

The uplink positioning information response may be an NRPPa message. The information response may include a periodic uplink reference signal sending configuration (which is denoted as a second configuration) of UE, or may include a first configuration.

S704. The serving base station configures the UE with an SRS.

If the uplink positioning information response in S703 includes the first configuration, the serving base station configures the UE with an aperiodic SRS corresponding to the first configuration. If the uplink positioning information response in S703 includes the second configuration, the serving base station configures the UE with a periodic SRS corresponding to the second configuration.

S705. The LMF selects list of measurement nodes.

S706. The LMF sends a measurement request to a measurement node in the list, and the measurement node receives the measurement request from the LMF.

If the uplink positioning information response in S703 includes the first configuration, the measurement request includes the first configuration. Otherwise, the measurement request always includes the second configuration.

S707. The measurement node returns a measurement response to the LMF, and the LMF receives the measurement response from the measurement node.

The measurement response includes positioning measurement information of the UE.

The measurement request and the measurement response may be LTE positioning protocol (LPP) messages.

S705, S706, and S707 are optional.

If the uplink positioning response information in S703 does not include the first configuration, S708 is further included after S707.

S708. The serving base station determines the first configuration for sending an aperiodic reference signal by the UE and subsequent steps.

S709. The serving base station sends an uplink positioning information indication (UL positioning information indication) to the LMF. The LMF receives the uplink positioning information indication from the serving base station.

The uplink positioning information indication includes the first configuration.

If S704 is not performed, S710 may be further included after S709.

S710 is the same as S704.

S711. The LMF sends the measurement request to the measurement node in the list, and the measurement node receives the measurement request from the LMF.

The measurement request includes the first configuration.

S712. The measurement node returns the measurement response to the LMF, and the LMF receives the measurement response from the measurement node.

The measurement response includes the positioning measurement information of the UE.

Figure 8:
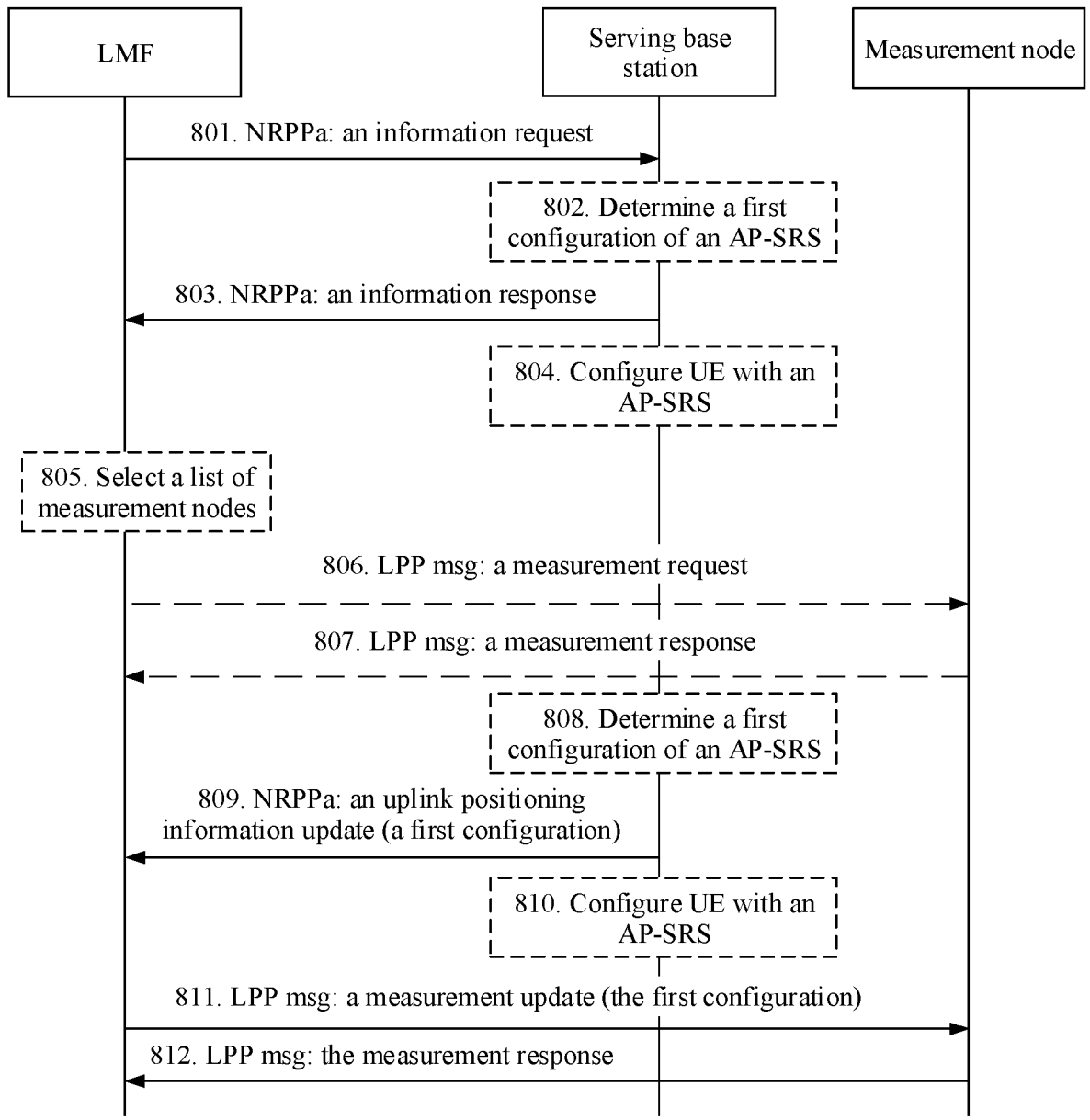
FIG. 8 is a schematic flowchart of another reference signal configuration determining method in an application scenario according to an embodiment of this application.

As shown in FIG. 8, in another application scenario, a reference signal configuration determining method is described below. For example, a network device is a serving base station of a terminal, a location management function is an LMF, and a measurement network element may also be a measurement node.

S801 to S808 are the same as S701 to S708.

S809. The serving base station sends an uplink positioning information update (UL positioning information update) message to the LMF. The LMF receives the uplink positioning information update message from the serving base station.

The uplink positioning information update message includes the first configuration.

S810 is the same as S804.

S811. The LMF sends a measurement update message to the measurement node in the list, and the measurement node receives the measurement update message from the LMF. The measurement update message includes the first configuration.

S812. The measurement node returns the measurement response to the LMF, and the LMF receives the measurement response from the measurement node.

The measurement response includes positioning measurement information of UE.

Figure 9:
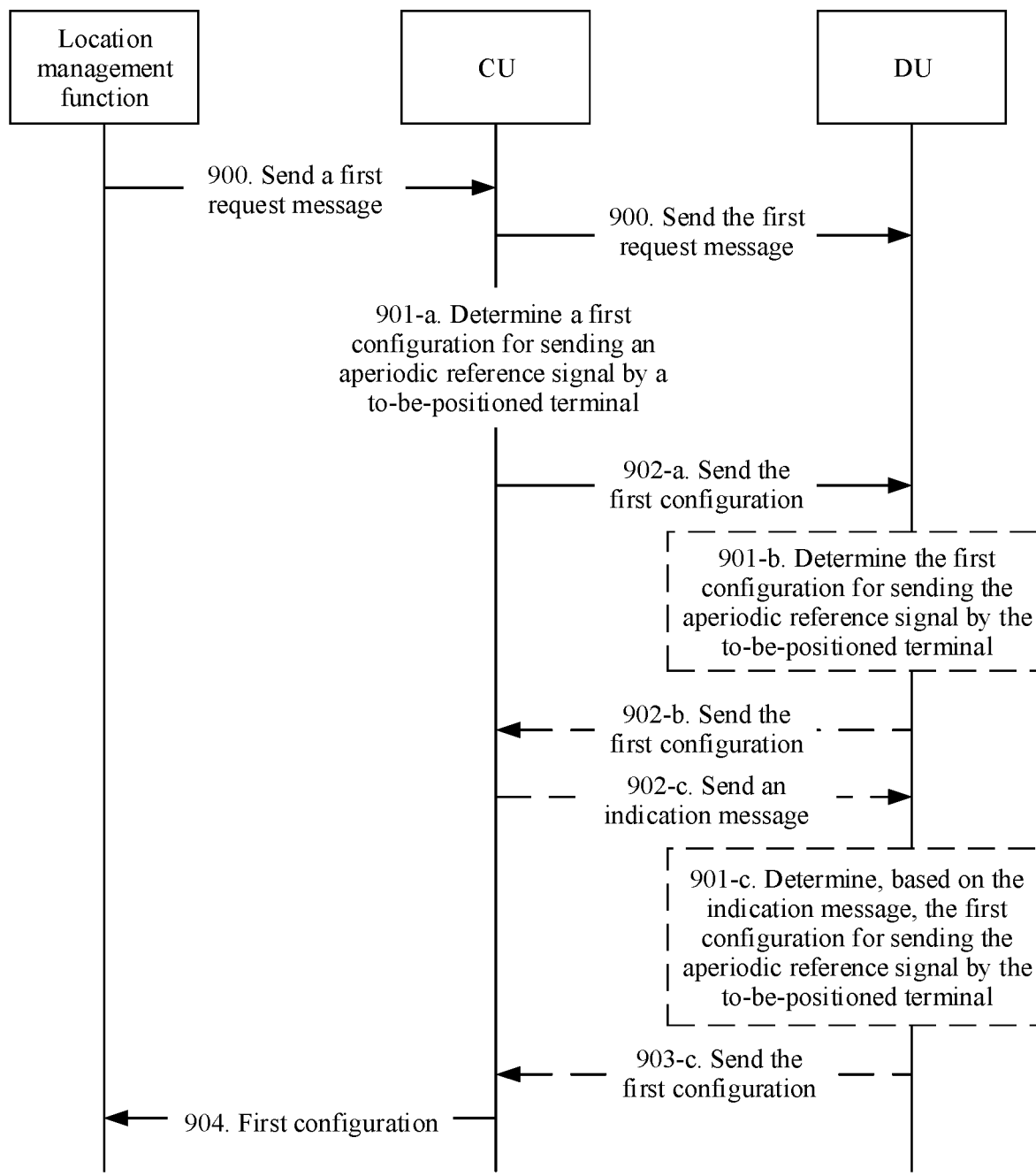
FIG. 9 is a schematic flowchart of a reference signal configuration determining method in a CU-DU separation architecture according to an embodiment of this application.

As described in the foregoing possible forms of the network device, the network device may be in a CU-DU separation architecture. In the CU-DU separation architecture, the foregoing operations performed by the network device may be completed by a CU or a DU. FIG. 9 shows a reference signal configuration determining method in the CU-DU separation architecture provided in this embodiment of this application. The method is described below.

Based on different determining entities of a first configuration, three scenarios including S901-a and S902-a, S901-b and S902-b, and S901-c and S902-c are described separately.

S901-a. A CU determines the first configuration for sending an aperiodic reference signal by a to-be-positioned terminal.

S902-a. The CU sends the first configuration to a DU.

S901-b. The DU determines the first configuration for sending the aperiodic reference signal by the to-be-positioned terminal.

S902-b. The DU sends the first configuration to the CU.

After determining the first configuration or receiving the first configuration from the CU, the DU configures a terminal to send the aperiodic reference signal based on the first configuration.

S901-c. The CU sends an indication message to the DU, where the indication message is used to indicate the DU to configure sending of the aperiodic reference signal.

S902-c. After receiving the indication message from the CU, the DU determines, based on the indication message, the first configuration for sending the aperiodic reference signal by the to-be-positioned terminal.

S903-c. The DU sends the first configuration to the CU.

S904. The CU sends the first configuration to a location management function.

For an explanation and a function of the first configuration, refer to the foregoing description. Details are not described herein again.

Optionally, the CU sends first indication information to the location management function.

Optionally, before the CU sends the first indication information to the location management function, the CU receives the first indication information from the DU.

The first indication information is used to indicate that the first configuration is a configuration of the aperiodic reference signal. For an explanation and a function of the first indication information, refer to the foregoing description of the first indication information. Details are not described herein again.

Optionally, before S901-a (or S901-b or S901-c), S900 is further included.

S900. The location management function sends a first request message to the CU, and the CU receives the first request message from the location management function. The CU sends the first request message to the DU.

For an explanation and a function of the first request message, refer to the foregoing description of the first request message. Details are not described herein again.

The DU sends a first response message for the first request message to the location management function. Alternatively, the DU may send a first response message for the first request message to the location management function through the CU. Specifically, the DU sends the first response message to the CU, and the CU sends the first response message to the location management function. For an explanation and a function of the first response message, refer to the foregoing description of the first request message. Details are not described herein again.

For operations of the location management function and a measurement network element, refer to the foregoing related description. Details are not described herein again.

For example, the location management function sends a measurement request to the measurement network element, and the measurement network element receives the measurement request from the location management function.

It may be understood that in the CU-DU separation architecture, signaling between the DU and the location management function needs to pass through the CU. For example, the location management function sends the first request message to the CU, and the CU sends the first request message to the DU. In an actual application, the CU may forward a message received from the location management function, or may parse content in the message and encapsulate the message, and send the encapsulated message to the DU. For another example, the DU sends the first configuration to the CU, and the CU sends the first configuration to the location management function.

In the foregoing embodiments provided in this application, the methods provided in embodiments of this application are separately described from perspectives of the network device, the location management function, and interaction between the network device and the location management function. When the network device includes the CU and the DU, descriptions are further provided from a perspective of interaction between the CU, the DU, and the location management function. To implement functions in the foregoing methods provided in embodiments of this application, the network device and the location management function may include a hardware structure and/or a software module, to implement the foregoing functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions.

Figure 10:
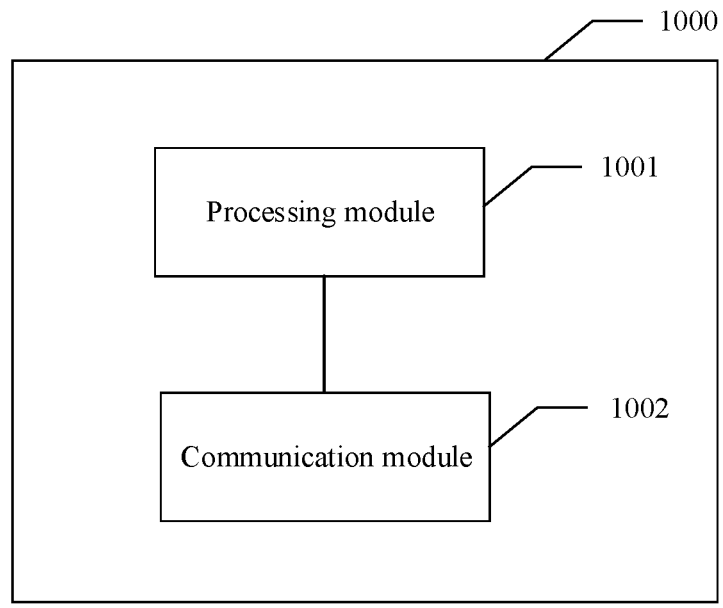
FIG. 10 is a first schematic diagram of a structure of an apparatus according to an embodiment of this application.

As shown in FIG. 10, based on a same technical concept, an embodiment of this application further provides an apparatus 1000. The apparatus 1000 may be a location management function or a network device, may be an apparatus in the location management function or the network device, or may be an apparatus that can be used together with the location management function or the network device. In a design, the apparatus 1000 may include modules that are in a one-to-one correspondence with the methods/operations/steps/actions performed by the location management function or the network device in the foregoing method embodiments. The modules may be implemented by a hardware circuit, software, or a combination of a hardware circuit and software. In a design, the apparatus may include a processing module 1001 and a communication module 1002.

When the apparatus is configured to execute the method executed by the network device:

The processing module 1001 is configured to determine a first configuration for sending an aperiodic reference signal by a to-be-positioned terminal.

The communication module 1002 is configured to send the first configuration to the location management function.

When the apparatus is configured to execute the method executed by a CU:

The processing module 1001 is configured to determine a first configuration for sending an aperiodic reference signal by a to-be-positioned terminal.

The communication module 1002 is configured to send the first configuration to the location management function.

Alternatively, the communication module 1002 is configured to: receive, from a DU, the first configuration for sending the aperiodic reference signal by the to-be-positioned terminal; and send the first configuration to the location management function.

When the apparatus is configured to execute the method executed by a DU:

The processing module 1001 is configured to determine a first configuration for sending an aperiodic reference signal by a to-be-positioned terminal.

The communication module 1002 is configured to send the first configuration to the location management function through the CU.

When the apparatus is configured to execute the method executed by the location management function:

The communication module 1002 is configured to receive a first configuration from the network device, where the first configuration is a configuration for sending an aperiodic reference signal by a to-be-positioned terminal.

The foregoing is merely an example for description. It may be understood that the processing module 1001 and the communication module 1002 may be further configured to perform other corresponding steps or operations performed by the devices in the foregoing method embodiments. Details are not described herein again.

Division into modules in embodiments of this application is an example, and is merely logical function division. During actual implementation, there may be another division manner. In addition, function modules in embodiments of this application may be integrated into one processor, or each of the modules may exist alone physically, or two or more modules are integrated into one module. The integrated module may be implemented in a form of hardware, or may be implemented in a form of a software function module.

Figure 11:
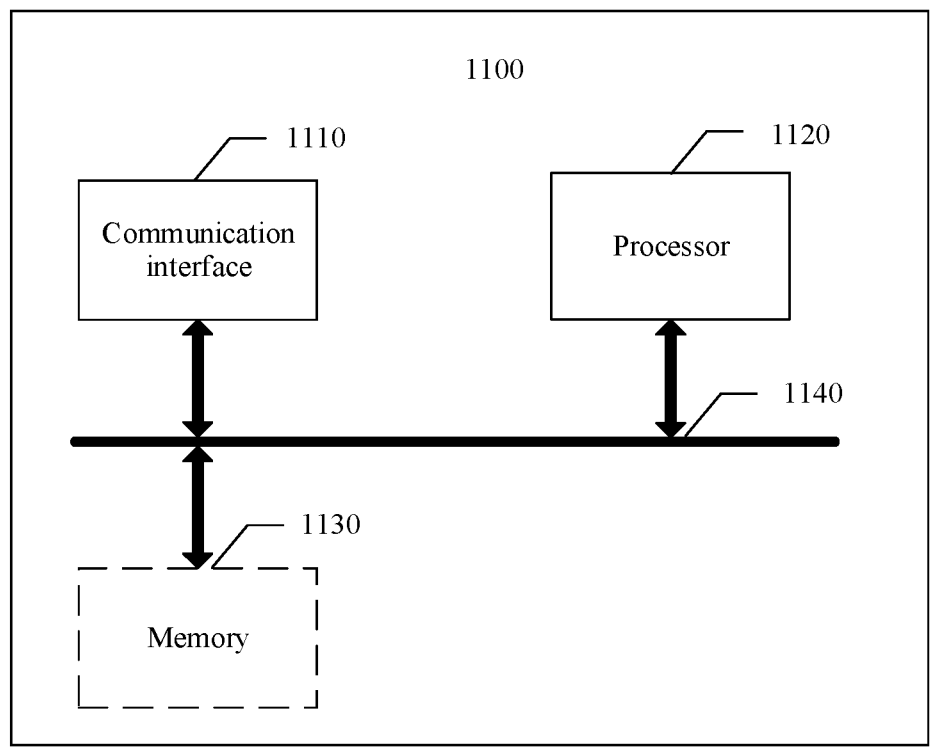
FIG. 11 is a second schematic diagram of a structure of an apparatus according to an embodiment of this application.

FIG. 11 shows an apparatus 1100 according to an embodiment of this application. The apparatus 1100 is configured to implement functions of the location management function or the network device in the foregoing method. Alternatively, the apparatus 1100 is configured to implement functions of a CU or a DU. When the apparatus 1100 is configured to implement functions of the network device, the apparatus may be the network device, may be an apparatus in the network device, or may be an apparatus that can be used together with the network device. When the apparatus 1100 is configured to implement functions of the location management function, the apparatus may be the location management function, may be an apparatus in the location management function, or may be an apparatus that can be used together with the location management function. When the apparatus 1100 is configured to implement functions of the CU, the apparatus may be the CU, may be an apparatus in the network device, or may be an apparatus that can be used together with the CU. When the apparatus 1100 is configured to implement functions of the DU, the apparatus may be the DU, may be an apparatus in the DU, or may be an apparatus that can be used together with the DU.

The apparatus may be a chip system. In embodiments of this application, the chip system may include a chip, or may include a chip and another discrete component. The apparatus 1100 includes at least one processor 1120, configured to implement functions of the location management function or the network device in the method provided in embodiments of this application. The apparatus 1100 may further include a communication interface 1110. In embodiments of this application, the communication interface may be a transceiver, a circuit, a bus, a module, or a communication interface of another type, and is configured to communicate with another device by using a transmission medium. For example, the communication interface 1110 is used by a component in the apparatus 1100 to communicate with the another device. For example, when the apparatus 1100 is the network device, the another device may be the location management function. When the apparatus 1100 is the location management function, another apparatus may be the network device. For example, when the apparatus 1100 is the CU, the another device may be the DU or the location management function. When the apparatus 1100 is the DU, the another apparatus may be the CU or the location management function.

The processor 1120 receives and sends data through the communication interface 1110, and is configured to implement the method in the foregoing method embodiments. For example, when the apparatus implements the function of the network device, the processor 1020 is configured to determine a first configuration for sending an aperiodic reference signal by a to-be-positioned terminal. The communication interface 1110 is configured to send the first configuration to the location management function.

When the apparatus is configured to execute the method executed by the CU:

The processor 1120 is configured to determine a first configuration for sending an aperiodic reference signal by a to-be-positioned terminal.

The communication interface 1110 is configured to send the first configuration to the location management function.

Alternatively, the communication module 1002 is configured to: receive, from the DU, the first configuration for sending the aperiodic reference signal by the to-be-positioned terminal; and send the first configuration to the location management function.

When the apparatus is configured to execute the method executed by the DU:

The processor 1120 is configured to determine a first configuration for sending an aperiodic reference signal by a to-be-positioned terminal.

The communication interface 1110 is configured to send the first configuration to the location management function through the CU.

When the apparatus is configured to execute the method executed by the location management function:

The communication interface 1110 is configured to receive a first configuration from the network device, where the first configuration is a configuration for sending an aperiodic reference signal by a to-be-positioned terminal.

For other operations performed by the processor 1120 and the communication interface 1110, refer to detailed descriptions in the method examples. Details are not described herein again.

The apparatus 1100 may further include at least one memory 1130 configured to store program instructions and/or data. The memory 1130 is coupled to the processor 1120. Coupling in embodiments of this application is an indirect coupling or a communication connection between apparatuses, units, or modules, may be in an electrical, a mechanical, or another form, and is used for information exchange between the apparatuses, the units, or the modules. The processor 1120 may cooperate with the memory 1130. The processor 1120 may execute the program instructions stored in the memory 1130. At least one of the at least one memory may be included in the processor.

A specific connection medium between the communication interface 1110, the processor 1120, and the memory 1130 is not limited in this embodiment of this application. In this embodiment of this application shown in FIG. 11, the memory 1130, the communication interface 1110, and the processor 1120 are connected through a bus 1140. The bus is represented by using a bold line in FIG. 11. A manner of connection between other components is merely an example for description, and is not limited thereto. The bus may be classified into an address bus, a data bus, a control bus, and the like. For ease of representation, only one thick line is used to represent the bus in FIG. 11, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or a transistor logic device, a discrete hardware component, or the like, and may implement or perform the methods, steps, and the logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware and software modules in the processor.

In embodiments of this application, the memory may be a non-volatile memory, such as a hard disk drive (HDD) or a solid-state drive (SSD), or may be a volatile memory, such as a random access memory (RAM). The memory is any other medium that can be used to carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

An embodiment of this application provides a computer storage medium that stores computer-readable instructions. When the computer-readable instructions are run on a communication apparatus, the communication apparatus is enabled to perform the foregoing method embodiments.

An embodiment of this application provides a computer program product including instructions. When the computer program product runs on a communication apparatus, the communication apparatus is enabled to perform the foregoing method embodiments.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk storage, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

The computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although some preferred embodiments of this application have been described, persons skilled in the art can make changes and modifications to these embodiments once they learn of the basic inventive concept. Therefore, the following claims are intended to be construed as to cover the preferred embodiments and all changes and modifications falling within the scope of this application.

It is clear that a person skilled in the art can make various modifications and variations to embodiments of this application without departing from the spirit and scope of embodiments of this application. This application is intended to cover these modifications and variations of embodiments of this application provided that they fall within the scope of the claims of this application and equivalent technologies thereof.

What is claimed is:

1. A reference signal based positioning method comprising:
    receiving, by a network device, a positioning information request message from a location management function, wherein the positioning information request message is used to request an uplink sounding reference signal (SRS) configuration of a terminal,
        wherein the positioning information request message further comprises third indication information for indicating a type of the uplink SRS configuration, and
        wherein the type of the uplink SRS configuration comprises an aperiodic SRS configuration;
    sending, by the network device, a positioning information response message to the location management function, wherein the positioning information response message comprises information for the aperiodic uplink SRS configuration of the terminal; and
    configuring, by the network device, an aperiodic uplink SRS resource for the terminal in response to the positioning information response message.

2. The method according to claim 1, wherein the positioning information response comprises first indication information, wherein the first indication information indicates that the SRS configuration is an aperiodic reference signal.

3. The method according to claim 1, wherein the positioning information request comprises a second indication information, and the second indication information indicates whether to request the configuration for sending the aperiodic reference signal by the terminal.

4. A reference signal based positioning method comprising:
  sending, by a location management function, a positioning information request message to a network device,
    wherein the positioning information request message is used to request an uplink sounding reference signal (SRS) configuration of a terminal,
    wherein the positioning information request message further comprises third indication information for indicating a type of the uplink SRS configuration, and
    wherein the type of the uplink SRS configuration comprises an aperiodic SRS configuration; and
  receiving, by the location management function, a positioning information response message sent by the network device,
    wherein the positioning information response message comprises information for the aperiodic uplink SRS configuration of the terminal.

5. A communication apparatus comprising at least one processor coupled to at least one memory storing programming instructions executable by the at least one processor to perform operations comprising:
  receiving a positioning information request message from a location management function,
    wherein the positioning information request message is used to request an uplink sounding reference signal (SRS) configuration of a terminal,
    wherein the positioning information request message further comprises third indication information for indicating a type of the uplink SRS configuration, and
    wherein the type of the uplink SRS configuration comprises an aperiodic SRS configuration:
  sending a positioning information response message to the location management function,
    wherein the positioning information response message comprises information for the aperiodic uplink SRS configuration of the terminal; and
  configuring an uplink SRS resource for the terminal in response to the positioning information response message.

6. The communication apparatus according to claim 5, wherein the positioning information response comprises first indication information, wherein the first indication information indicates that the SRS configuration is an aperiodic reference signal.

7. The communication apparatus according to claim 5, wherein the positioning information request comprises a second indication information, and the second indication information indicates whether to request the configuration for sending the aperiodic reference signal by the terminal.

8. A communication apparatus comprising at least one processor coupled to at least one memory storing programming instructions executable by the at least one processor to perform operations comprising:
  sending a positioning information request message to a network device,
    wherein the positioning information request message is used to request an uplink sounding reference signal (SRS) configuration of a terminal,
    wherein the positioning information request message further comprises third indication information for indicating a type of the uplink SRS configuration, and
    wherein the type of the uplink SRS configuration comprises an aperiodic SRS configuration; and
  receiving a positioning information response message sent by the network device,
    wherein the positioning information response message comprises information for the aperiodic uplink SRS configuration of the terminal.

9. A non-transitory computer-readable storage medium, wherein the computer storage medium stores computer-readable instructions, and when the computer-readable instructions are run on a communication apparatus, the communication apparatus is enabled to perform the method according to claim 1.

10. A non-transitory computer-readable storage medium, wherein the computer storage medium stores computer-readable instructions, and when the computer-readable instructions are run on a communication apparatus, the communication apparatus is enabled to perform the method according to claim 4.

11. The method according to claim 4, wherein the positioning information response message comprises first indication information for indicating the uplink SRS configuration is an aperiodic reference signal.

12. The method according to claim 4, wherein the positioning information request message further comprises a second indication information for indicating whether to request the configuration for sending the aperiodic reference signal by a terminal.

13. The communication apparatus according to claim 8, wherein the positioning information response comprises first indication information for indicating the SRS configuration is an aperiodic reference signal.

14. The communication apparatus according to claim 8, wherein the positioning information request comprises a second indication information for indicating whether to request the configuration for sending the aperiodic reference signal by the terminal.

* * * * *

UNITED STATES PATENT AND TRADEMARK OFFICE
CERTIFICATE OF CORRECTION

PATENT NO. : 12,267,275 B2
APPLICATION NO. : 17/709127
DATED : April 1, 2025
INVENTOR(S) : Hao et al.

Page 1 of 1

It is certified that error appears in the above-identified patent and that said Letters Patent is hereby corrected as shown below:

In the Claims

Claim 5: Column 27, Line 36: "comprises an aperiodic SRS configuration:" should read as -- comprises an aperiodic SRS configuration; --.

Signed and Sealed this
Twenty-second Day of July, 2025

Coke Morgan Stewart
*Acting Director of the United States Patent and Trademark Office*